United States Patent [19]

Deltrap

[11] 4,232,222
[45] Nov. 4, 1980

[54] BINOCULAR NIGHT GLASS

[75] Inventor: Johan H. M. Deltrap, Oostvoorne, Netherlands

[73] Assignee: N.V. Optische Industrie "De Oude Delft", Delft, Netherlands

[21] Appl. No.: 938,762

[22] Filed: Sep. 1, 1978

[30] Foreign Application Priority Data

Sep. 5, 1977 [DE] Fed. Rep. of Germany ....... 2739927

[51] Int. Cl.³ ............................................. H01J 31/49
[52] U.S. Cl. ................................................... 250/333
[58] Field of Search ................................. 250/330, 333

[56] References Cited

U.S. PATENT DOCUMENTS

| 3,267,283 | 8/1966 | Kapany | 250/460 |
| 3,454,773 | 7/1969 | Bulthuis et al. | 250/333 X |
| 3,458,744 | 7/1969 | Sowers et al. | 313/220 |
| 3,509,344 | 4/1970 | Bouwers | 250/333 |

Primary Examiner—Davis L. Willis
Attorney, Agent, or Firm—O'Brien & Marks

[57] ABSTRACT

An improved binocular night glass suitable for use with infrared light and relatively low levels of visible light without changing the viewing system, in particular its prism system. According to the invention the improvement comprises that the image converter includes two image conversion tube sections, only one of which results in image reversal.

4 Claims, 1 Drawing Figure

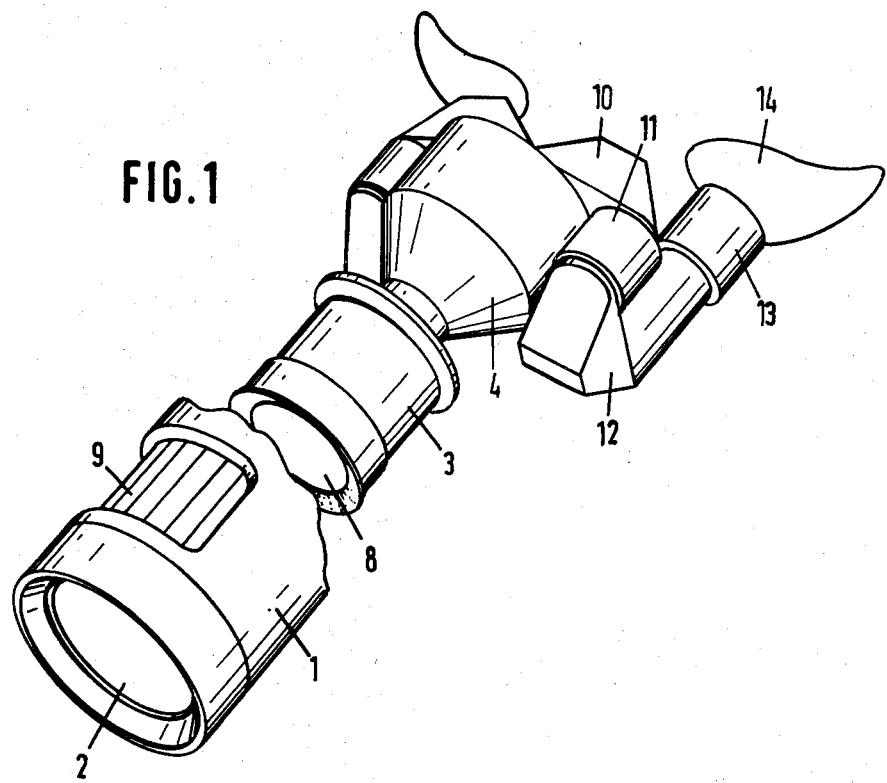
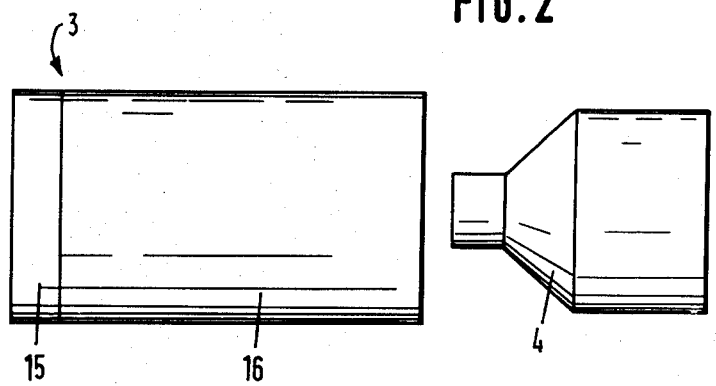

BINOCULAR NIGHT GLASS

This invention relates to a binocular night glass.

A prior night glass of the binocular type is described in U.S. Pat. No. 3,454,773, and comprises an image converter on the photocathode of which an image can be formed by means of an optical input system, the image converter proper and a collimator lens whose focal plane is located in the screen of the image converter being housed in a central tube member of the instrument; there being further provided a binocular viewer which in addition to said collimator lens comprises a binocular, each telescope of which receives a portion of the parallel rays from the collimator lens, the light paths in the two telescopes of the viewer each comprising two prisms of 90°, causing multiple deflection of the rays so that the exit pupils of these telescopes are located closely behind the plane defined by the rear end of the central tube member, and the housings of the telescopes extend next to the central tube member over a major portion of the length thereof, at least one of these housings being mounted for rotation on the central tube member by means of one or more rings embracing the central tube member.

In this prior night glass, which is designed to operate with infrared light, the image converter comprises a single image conversion tube.

In certain cases, however, it is desirable that the instrument can be used not only with infrared light, but also with visible light of such levels as to require greater intensification that can be achieved with a single image conversion tube with image reversal. In that case the image converter comprises two series-connected image conversion tubes. As a result of the use of these two image conversion tubes, the image ultimately perceived is reversed, which reversal can be neutralized by replacing the prisms of 90° in the above instrument by prisms of 120°, as described in German "Gebrauchsmuster" (Utility Model) No. 7,228,989.

It is clear that such a change involves not only replacing the single image conversion tube by a pair of image conversion tubes, but also a redesign of the viewing system with the prisms. This means that, if the instrument is reconstructed, as described in the above German Gebrauchsmuster, to work with infrared light and also with visible light of relatively low levels, it must in fact be changed altogether.

It is an object of the present invention to simplify such a reconstruction in the sense that the viewing system, and in particular the prism system, need not be changed, with the added advantage that no additional adjustment is necessary, while yet an image of correct orientation and adequate intensity can be observed.

To this effect, according to the present invention, the image converter is formed of two image conversion tube sections, only one of which results in a reversal of the image.

The section which does not result in image reversal is preferably a so-called proximity focus type image conversion tube or a so-called MCP wafer, i.e., a proximity focus tube employing a micro channel plate.

As stated above, such a composite image conversion tube results in a single reversal of the image, which can be neutralized by means of the viewing system with prisms of 90° as contained in the night glass to be reconstructed, while yet, owing to the use of the proximity type section in combination with an image conversion tube of normal type, the image is intensified to a sufficient extent.

The use of such an image conversion tube makes it necessary for the optical input system to be adapted to the image conversion tube, while, depending on the type of image conversion tube that results in image reversal and forms part of the image converter, the collimation objective should or should not be changed, as will be described hereinafter.

The invention will now be described in more detail with reference to the accompanying drawings. In said drawings, FIG. 1 shows a perspective view of the construction of one embodiment of a night glass according to the present invention, with parts of its housing being removed to show its various parts; and FIG. 2 shows, highly diagrammatically, the construction of a different embodiment of part of a night glass according to the present invention.

The night glass according to the invention shown in FIG. 1 comprises a central tube member 1 housing a front object lens 2, an image converter 3, and a collimating lens 4, disposed in alignment with each other. Front object lens 2 is mounted in the front part of tube member 1 and is exchangeable. Its focal point is adjusted to lie on the photocathode 8 of image converter 3 by means of a ring 9.

Collimating lens 4 forms part of a viewing system, further comprising a prismatic binocular, one half of which is fully shown in FIG. 1, and only the parts of that half are provided with reference numerals. This telescope comprises a prism 10 of 90°, an object lens 11, a prism 12 of 90°, and an eye piece 13. The other telescope is built up in a similar manner.

In use, prism 10 receives a portion of the parallel rays leaving collimating lens 4, and reflects this portion to object lens 11. This lens focusses these rays into the focal plane of eye piece 13 to produce an image of the whole anode screen of image converter 3. Prism 12 deflects the optical axis twice through 90°, so that the optical axis resumes its original direction. The image is reversed four times in the instrument, i.e., in succession, by the front object lens, subsequently by the image converter, then by collimating lens 4 and object lens 11 together, and finally by the system 10, 12. As a result the ultimate image to be observed with the instrument is in its proper position.

As object lens 11 is placed between the first and the second prism, this lens and prism 12 can be placed next to the central tube member of the instrument. As a consequence, the overall length of the instrument is extremely short, and the required interocular distance can be realized in a simple manner.

Central tube member 1 may be so long as to accommodate two image conversion tubes.

As stated above, when two serially disposed normal image conversion tubes are used, there is one additional image reversal. So, if it is desired for the image to be observed in its proper orientation, further measures should be taken, for example, as described in German Utility Model No. 7,228,989, mentioned above, in which the prisms of 90° are replaced by prisms of 120°.

In the configuration employing two such serially connected image conversion tubes, however, a different course can be followed, as stated hereinbefore, in which the prismatic section of the viewing system is not changed, with the added advantage that no additional adjustment is required.

When that course is followed, according to the present invention, there is used a combination of a normal image conversion tube and one that does result in image reversal.

In the accompanying FIG. 2, such an image converter 3 including a combination of image conversion tubes is illustrated highly diagrammatically. As shown, it comprises a first image conversion tube section 15, for example, of the proximity focus type, and a second image conversion tube section 16, which may be of the normal type.

The first section may be an image conversion tube of the conventional proximity focus type, but in view of the intensification required in the instrument of the subject kind, a more special type of proximity tube is preferred, namely, a tube of the so-called MCP type, i.e., a proximity focus tube provided with a micro channel plate. It is clear, however, that the invention is not limited to the use of such a special tube. The only requirements are that the one tube section referred to does not result in image reversal and be responsive to both infrared and visible light.

As stated above, the second tube section may be a normal image conversion tube. This may be one in which the area of the input surface is equal to that of the output surface, but it is equally possible to use an image conversion tube in which the output surface has a considerably smaller area than the input surface, which results in a still further increase in intensification.

An advantage concomitant with the use of a tube of the latter type is that the collimating lens, as used in co-operation with the tube described in the German patent referred to, need not be replaced by a different type of collimating lens, since the adaptation at this side of the viewing system remains unaltered by the introduction of such an image conversion tube section.

The use, however, of a tube with a larger screen size than the above mentioned dimension, implies adaptation of the collimating lens to the tube. This makes the implementation of the improvement somewhat more complicated.

Although not shown in the drawings, the viewer telescopes are housed in a pair of housings which, in the instrument described in the above U.S. Pat. No. 3,454,773, respectively accommodate the power source and the high-voltage section for the instrument. This does not need to be changed either when the instrument is altered as described above, unless use is made of an image conversion tube which in itself accommodates the high-voltage section. In that case the space provided therefor in the viewing system can be used for accommodating, for example, a portion of the power source.

The foregoing shows that, in accordance with the present invention, a night glass of the type described in the U.S. Pat. No. 3,454,773 referred to can be rendered suitable, in an extremely simple manner, for operation with infrared light as well as visible light without this requiring any change or adjustment to the viewing system, in particular the prism system, while yet the required intensification is realized.

I claim:

1. A binocular night glass for both infrared and visible light, comprising
    an image converter including a series arrangement of a first image converting tube section of the proximity-focus type and a second image converting tube section which produces an image reversal,
    said image converting tube sections having a photocathode on the front thereof responsive to both infrared and visible light radiation,
    said image converting tube sections having an image screen on the rear thereof for producing an intensified image,
    an optical input system including a front object lens and a ring for adjusting the focal point of the front object lens for forming an image on the photocathode on the front of the image converter,
    a collimating lens having a focal plane located in the image screen on the rear of the image converter,
    a central tube member housing said image converter and said collimating lens,
    a pair of viewing devices each including a pair of 90° prisms, an object lens interposed between each pair of prisms, and an eye piece receiving respective portions of the parallel rays from the collimating lens to form a binocular with said collimating lens, and
    said prisms arranged so that light paths through the viewing devices are reflected alongside the central tube member over the collimating lens to position the eye pieces closely behind the plane defined by the rear end of the central tube member.

2. A night glass according to claim 1 wherein the first converting tube section is an image conversion tube of the so called MCP proximity type.

3. A night glass according to claim 2 wherein the second image converting tube section has an input surface area equal to its output surface area.

4. A night glass according to claim 1 wherein the second image converting tube section has an output surface whose area is substantially smaller than the area of its input surface.

* * * * *